United States Patent
Enomoto et al.

(10) Patent No.: US 7,634,740 B2
(45) Date of Patent: Dec. 15, 2009

(54) INFORMATION PROCESSING DEVICE, CONTROL METHOD FOR INFORMATION PROCESSING DEVICE, AND INFORMATION STORAGE MEDIUM

(75) Inventors: Shigeru Enomoto, Kanagawa (JP); Tsutomu Ogasawara, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 316 days.

(21) Appl. No.: 11/452,119

(22) Filed: Jun. 13, 2006

(65) Prior Publication Data
US 2006/0288308 A1 Dec. 21, 2006

(30) Foreign Application Priority Data
Jun. 17, 2005 (JP) ............................. 2005-178407

(51) Int. Cl.
G06F 3/048 (2006.01)
G06F 3/00 (2006.01)

(52) U.S. Cl. ..................... 715/810; 715/835; 715/834; 725/37

(58) Field of Classification Search ................. 715/837, 715/838, 839, 825, 810, 835, 830, 834, 818; 725/37
See application file for complete search history.

(56) References Cited

U.S. PATENT DOCUMENTS

| | | | | | |
|---|---|---|---|---|---|
| 5,870,099 | A | * | 2/1999 | Horii et al. | 345/427 |
| 6,005,578 | A | * | 12/1999 | Cole | 715/854 |
| 6,211,921 | B1 | * | 4/2001 | Cherian et al. | 348/565 |
| 6,618,063 | B1 | * | 9/2003 | Kurtenbach | 715/834 |
| 6,678,891 | B1 | * | 1/2004 | Wilcox et al. | 725/42 |
| 6,690,391 | B1 | * | 2/2004 | Proehl et al. | 715/720 |
| 6,910,191 | B2 | * | 6/2005 | Segerberg et al. | 715/830 |
| 6,976,228 | B2 | * | 12/2005 | Bernhardson | 715/830 |
| 2003/0004983 | A1 | * | 1/2003 | Cohen | 707/500 |

FOREIGN PATENT DOCUMENTS

| | | |
|---|---|---|
| JP | 6-342358 | 12/1994 |
| JP | 10-133842 | 5/1998 |
| JP | 2003-76460 | 3/2003 |
| JP | 2004-356774 | 12/2004 |

OTHER PUBLICATIONS

Notice of Rejection dated Nov. 4, 2008, from the corresponding Japanese Application.

* cited by examiner

*Primary Examiner*—Ting Lee
(74) *Attorney, Agent, or Firm*—Katten Muchin Rosenman LLP (57) ABSTRACT

An information processing device for facilitating a user's recognition of relevant information when relevant information concerning a predetermined menu item of a digital household electronic appliance, for example, is presented to the user.

11 Claims, 8 Drawing Sheets

| WORK ID | WORK TITLE | GENRE |
|---------|------------|-----------|
| WORK1   | A A A      | ACTION    |
| WORK2   | B B B      | ACTION    |
| WORK3   | C C C      | HUMAN     |
| WORK4   | D D D      | COMEDY    |
| WORK5   | E E E      | ADVENTURE |
| WORK6   | A A A 2    | ACTION    |

FIG. 8

| WORK ID | RELEVANT INFORMATION ID | DATA CATEGORY |
|---|---|---|
| WORK 1 | PERSON 1 | DIRECTOR |
| WORK 1 | PERSON 2 | PERFORMER |
| WORK 1 | PERSON 3 | PERFORMER |
| WORK 1 | WORK 6 | RELEVENT WORK |
| WORK 2 | PERSON 4 | DIRECTOR |
| WORK 2 | PERSON 2 | PERFORMER |
| ⋮ | ⋮ | ⋮ |
| WORK 6 | PERSON 1 | DIRECTOR |
| WORK 6 | PERSON 2 | PERFORMER |

FIG. 9

| PERSON ID | PERSON NAME | CATEGORY |
|---|---|---|
| PERSON 1 | X X X | DIRECTOR |
| PERSON 2 | Y Y Y | PERFORMER |
| PERSON 3 | Z Z Z | PERFORMER |
| ⋮ | ⋮ | ⋮ |

INFORMATION PROCESSING DEVICE, CONTROL METHOD FOR INFORMATION PROCESSING DEVICE, AND INFORMATION STORAGE MEDIUM

BACKGROUND OF THE INVENTION

The present invention is related to an information processing device for displaying an image representative of a menu item, a control method for the information processing device, and an information storage medium.

For a device such as a digital household electronic appliance, a user interface having preferable appearance and easy operability is strongly demanded. In order to meet this demand, there is available a user interface which composes a menu where an icon arranged in a two-dimensional manner is shown to represent a basic menu item which is preset to the device and a category to which the basic menu item belongs to (see Japanese Patent Laid-open Publication No. 2004-356774).

Such a device may have a function, when a basic menu item corresponds to the content possessed by the device, for example, for dynamically obtaining relevant information of the content, such as a genre, a director, and a performer of the content, from a table which stores the relevant information, and displaying the obtained relevant information. As a method for displaying relevant information in such a case, there is available a method for displaying a dedicated relevant information screen while erasing a menu screen. Another available method is such that relevant information is newly displayed on a menu screen while a basic menu item remains displayed intact without a change.

However, among the methods described above, according to a method in which a menu screen is erased, like the former method, correlation between the relevant information and the menu item is not easily understandable for a user as a selected menu item and a menu item presented as an alternative are erased.

Meanwhile, according to a method in which relevant information is displayed with a basic menu item remaining displayed intact without a change, like the latter method, although the above described problem is solved, a user needs to check a position where relevant information is displayed when the relevant information is displayed. Therefore, the user cannot recognize the relevant information at a glance. Moreover, as the basic menu item remains intact without a change on the screen, discrimination between a selected menu item and newly displayed relevant information is not easy.

The present invention has been conceived in view of the above described situation, and one of the objects of the present invention is to provide an information processing device for facilitating, when relevant information of a predetermined menu item which is pre-set in the information processing device is presented to a user, the user's recognition of the relevant information, a control method for the information processing device, and an information storage medium.

Another object of the present invention is to provide an information processing device for facilitating, when relevant information of a predetermined menu item which is pre-set in the information processing device is presented to a user, the user's discrimination between a selected menu item and newly displayed relevant information, a control method for the information processing device, and an information storage medium.

SUMMARY OF THE INVENTION

In order to solve the above described problem, according to the present invention, there is provided an information processing device, comprising: basic menu displaying means for displaying an image representative of a basic menu item list which includes one or more predetermined basic menu items, in a first displaying area; basic menu item selecting means for selecting one of the basic menu items from the one or more basic menu items as a selected basic menu item; first relevant information menu creating means for obtaining, from a relevant information table which stores each of the basic menu items and its relevant information so as to be associated with each other, relevant information associated with the selected basic menu item, as information on one or more first relevant information menu items, and creating a first relevant information menu item list which includes the one or more first relevant information menu items; first relevant information menu displaying means for displaying an image representative of the first relevant information menu item list, in the first displaying area; and basic menu redisplaying means for displaying at least a part of the image representative of the basic menu item list in a second displaying area which is different from the first displaying area.

According to another aspect of the present invention, there is provided an information processing device, comprising: first list displaying means for displaying an image representative of a first list; item selecting means for selecting one item from the first list as a selected item; second list displaying means for displaying an image representative of a second list associated with the selected item; and first list redisplaying means for deforming and displaying at least a part of the image representative of the first list.

According to still another aspect of the present invention, there is provided a method for controlling an information processing device, the method comprising the steps of displaying an image representative of a basic menu item list which includes one or more predetermined basic menu items, in a first displaying area; selecting one of the basic menu items from the one or more basic menu items as a selected basic menu item; obtaining, from a relevant information table which stores each of the basic menu items and its relevant information to be associated with each other, relevant information associated with the selected basic menu item, as information on one or more first relevant information menu items, and creating a first relevant information menu item list which includes the one or more first relevant information menu items; displaying an image representative of the first relevant information menu item list in the first displaying area; and displaying at least a part of the image representative of the basic menu item list in a second displaying area which is different from the first displaying area.

According to yet another aspect of the present invention, there is provided an information storage medium capable of being read by a computer which stores a program for causing the computer to execute the following steps of displaying an image representative of a basic menu item list which includes one or more predetermined basic menu items, in a first displaying area; selecting one of the basic menu items from the one or more basic menu items as a selected basic menu item; obtaining, from a relevant information table which stores each of the basic menu items and its relevant information so as to be associated with each other, relevant information associated with the selected basic menu item, as information on one or more first relevant information menu items, and creating a first relevant information menu item list which includes the one or more first relevant information menu items; displaying an image representative of the first relevant information menu item list in the first displaying area; and displaying at least a part of the image representative of the basic menu item list in a second displaying area which is different from the first displaying area.

DESCRIPTION OF THE PREFERRED EMBODIMENT

In the following, a preferred embodiment of the present invention will be described in detail with reference to the accompanied drawings.

Figure 1:
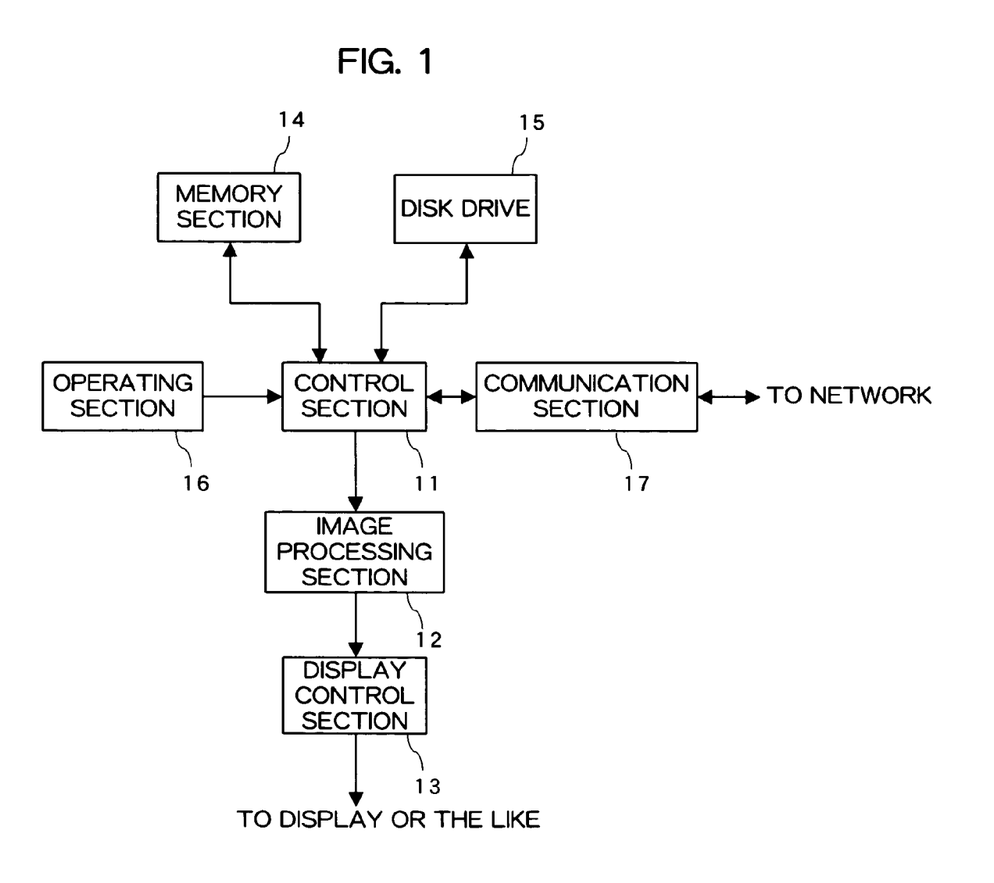
FIG. 1 is a block diagram showing a structure of an information processing device in an embodiment according to the present invention.

As shown in FIG. 1, an information processing device in an embodiment according to the present invention is constructed so as to comprise a control section 11, an image processing section 12, a display control section 13, a memory section 14, a disk drive 15, an operating section 16, a communication section 17.

Here, the control section 11 comprises, for example, a CPU, or the like, and executes a program stored in the memory section 14 or a program read out by the disk drive 15.

The image processing section 12 is a graphic processor for conducting drawing in response to an instruction sent from the control section 11. The result obtained through the drawing by the image processing section 12 is output to the display control section 13.

The display control section 13 in turn converts the result obtained through the drawing and supplied from the image processing section 12 into an image signal, and outputs the image signal to a display device such as a display apparatus, a home-use television set, and so forth, so that the result is shown as an image displayed on the screen of the display device to be presented to a user.

The memory section 14 is constructed so as to include a memory element such as a RAM, a ROM, or the like. This memory section 14 may hold a program to be executed by the control section 11. This memory section 14 also functions as a work memory for the control section 11. The disk drive 15 includes, for example, a portable optical disk drive, such as a DVD, a CD, or the like, and a hard disk drive or the like. The disk drive 15 may hold a program to be executed by the control section 11.

Figure 2:
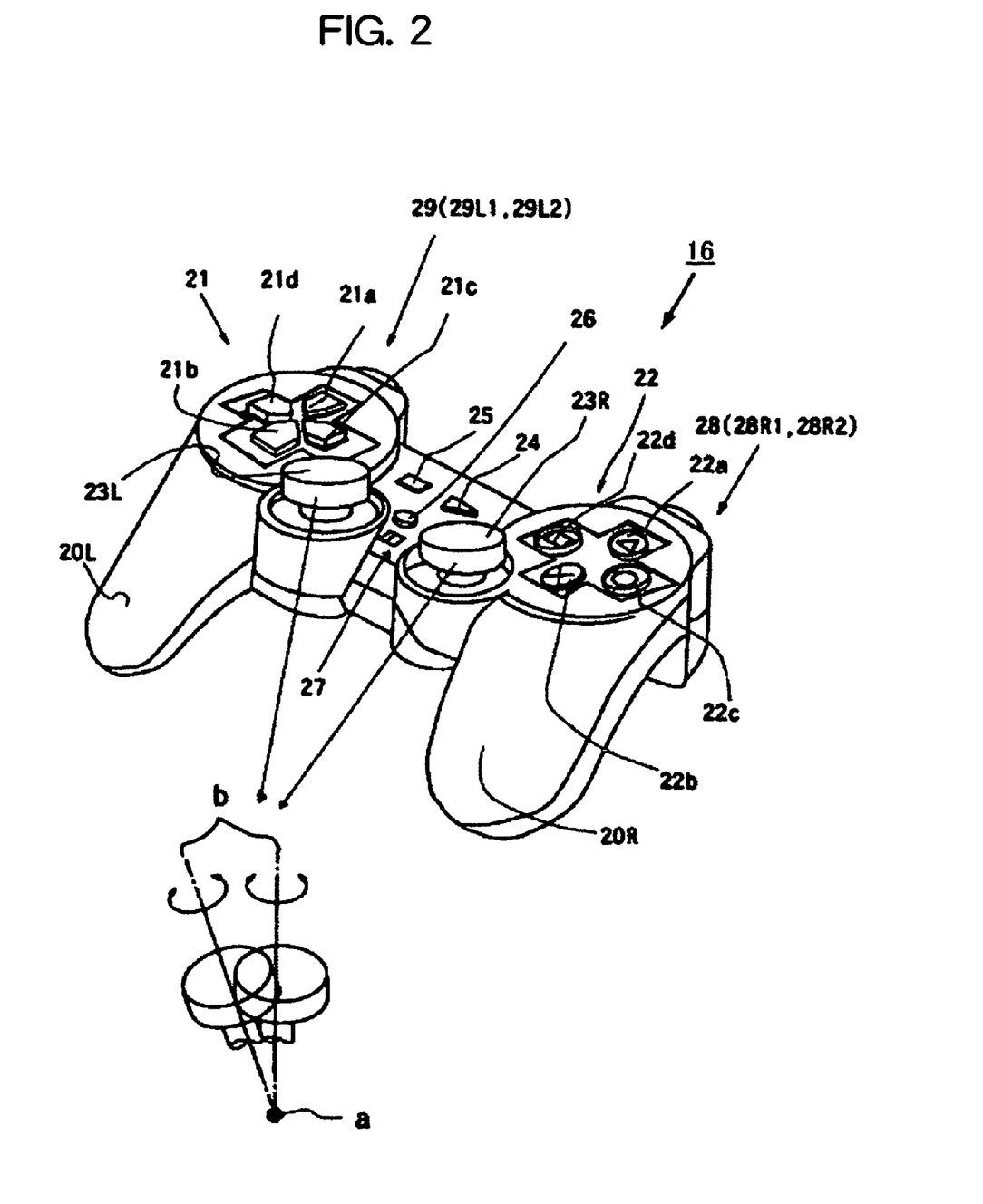
FIG. 2 is a diagram showing an example of a controller of the information processing device in an embodiment according to the present invention.

The operating section 16, having accepted a user's instruction operation, outputs the content of the instruction operation to the control section 11. The operating section 16 may be a keyboard, a mouse, or a controller of a home-use game machine. In the following, a case in which the operating section 16 is a controller of a home-use game machine will be described as an example. A controller which serves as an operating section 16 comprises, as shown in FIG. 2, grip sections 20R, 20L. A user grasps these grip sections 20 using his/her right and left hands. At a position capable of being operated by the user with his/her thumbs while grasping the grip sections 20, a first operating section 21, a second operating section 22, and analogue operating sections 23R, 23L are provided.

Here, in the first operating section 21, an upper direction instruction key 21a, a lower direction instruction key 21b, a right direction instruction key 21c, and a left direction instruction key 21d are provided. The user can instruct the direction, using these direction instruction keys 21a, 21b, 21c, and 21d, to thereby, for example, specify an object for control shown on the screen. Also, in the second operating section 22, a triangle button 22a having a triangular ([△]) imprint formed thereon, an X button 22b having an X shaped ([x]) imprint formed thereon, an O button 22c having an O shaped ([o]) imprint formed thereon, and a rectangle button 22d having a rectangular ([□]) imprint formed thereon are provided. For example, these buttons 22a, 22b, 22c, and 22d are assigned respective functions so as to carry out any processing depending on an operational object specified using the direction instruction keys 21a, 21b, 21c, and 21d.

The analogue operating sections 23R, 23L are adapted to an operation by being tilted (or a tilting operation) with the point a serving as a fulcrum. The analogue operating sections 23R, 23L are also adapted to rotation in the tilted posture around the rotational axis b which is defined as passing through the point a. When not performing the tilting operation, these operating sections 23R, 23L remain in a standing position without tilting (a reference position). During a tilting operation with the operating sections 23R, 23L being pressed, coordinate values (x, y) on the x-y coordinate which are defined according to the amount and direction of the tilt relative to the reference position are determined and output as an operational output to the control section 11.

It should be noted that the controller may additionally comprise a start button 24 for instructing the control section 11 to initiate execution of a program, and a selection button 25 and a mode selection switch 26 for instructing switching among various modes. Specifically, upon selection of a specific mode (an analogue mode) via the mode selection switch 26, a light emission diode (LED) 27 is given light emission control and the analogue operating sections 23R, 23L are brought into an operating state. Alternatively, when another mode (a digital mode) is selected, the light emission diode 27 is controlled to black out, so that the analogue operating sections 23R, 23L are brought into a non-operating state.

On the controller, a right button 28 and a left button 29 are provided at positions capable of being operated by the user with his/her index finger, or the like, for example, while grasping the respective grip sections 20R, 20L with his/her right and left hands, respectively. The respective buttons 28, 29 have first and second right buttons 28R1, 28R2, and first and second left buttons 29L1, 29L2, respectively, which are arranged in line in the perpendicular direction on the controller.

The communication section 17 is a network card, a modem, or the like, and sends information via a network according to an instruction sent from the control section 11. In addition, the communication section 17 receives information arriving via a network and then outputs the received information to the control section 11. It should be noted that the communication section 17 is not mandatory.

In the following, an example in which a content reproducing device, which is an illustration of the information processing device according to an embodiment of the present invention, for reproducing contents, such as a movie, music, a photo, and so forth, according to a user's instruction, displays a menu screen and operates according to a user's instruction operation will be described. It should be noted that the present invention is similarly applicable to an information processing device other than a content reproducing device.

Figure 3:
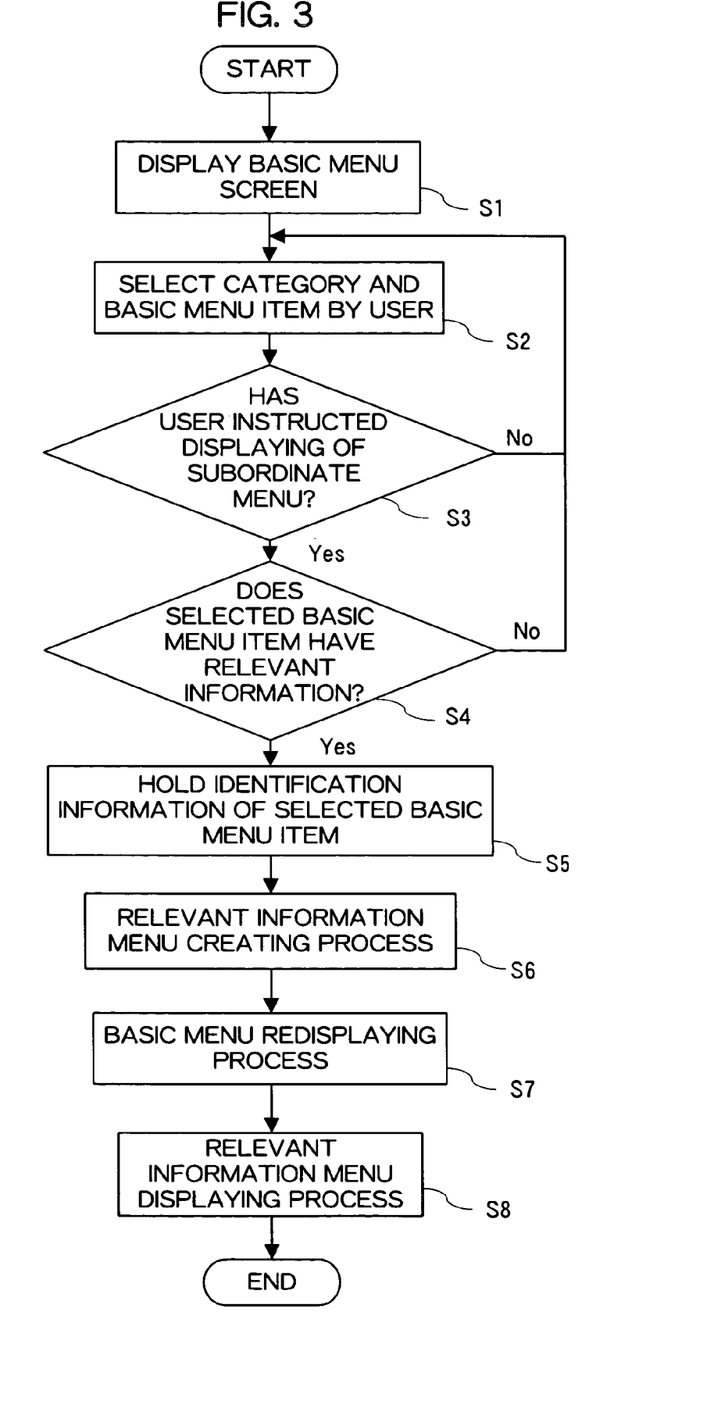
FIG. 3 is a flowchart showing a process to shift from a basic menu screen to a relevant information screen, which is carried out by the information processing device in an embodiment according to the present invention.

FIG. 3 is a flowchart of a process to display a basic menu screen upon activation of the content reproducing device, for example, in an embodiment according to the present invention, and to shift from the basic menu screen to a relevant information screen in response to a user's operation.

Figure 4:
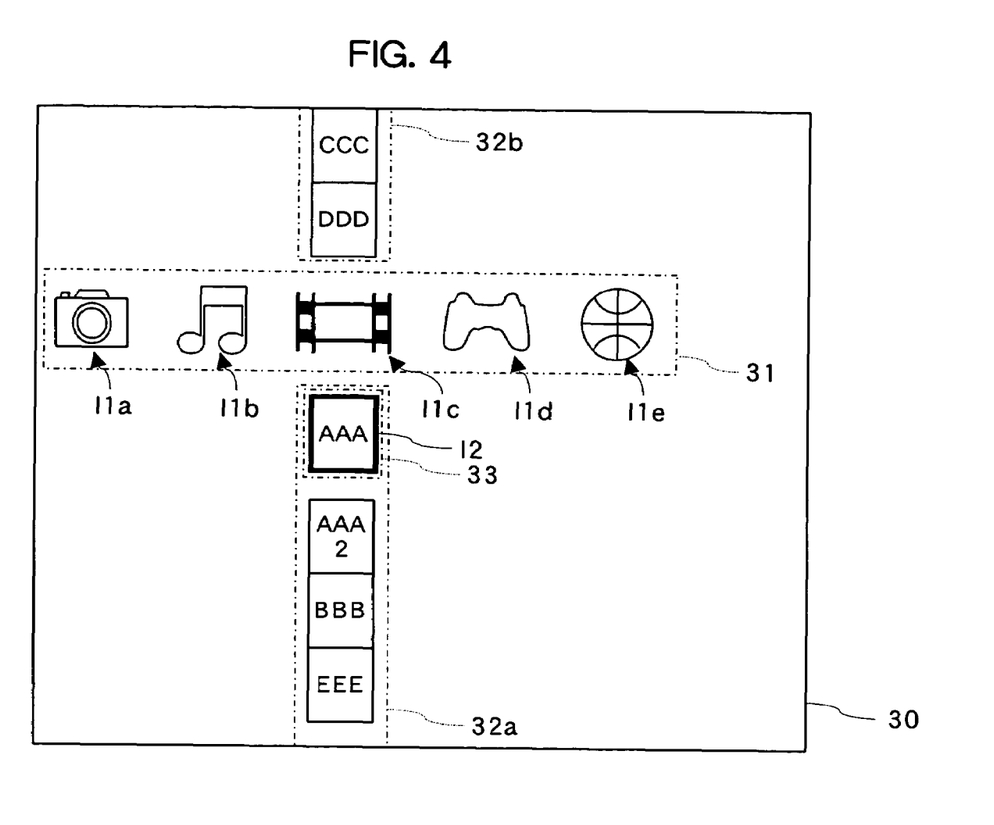
FIG. 4 is a diagram showing an example of a basic menu screen to be displayed by the information processing device in an embodiment according to the present invention.

Initially, the content reproducing device shows a basic menu screen 30, such as is shown in FIG. 4, on a screen (step S1). In the following, information to be displayed on the basic menu screen 30 will be described.

In a category icon displaying area 31 on the basic menu screen 30, category icons are displayed in a horizontal row. Here, "a category" means a group of basic menu items which are classified according to a predetermined criterion. A "basic menu item" means a menu item representative of the contents registered in the content reproducing device or a function of the content reproducing device, which is to be designated by a user, and so on. For example, a category according to the kind of content, such as a movie, music, a photo, and so forth, and a category including an operational setting item for the device, or the like, are available.

It should be noted that an icon is an image composed of a pattern, a symbol, a letter, and so forth, and displayed on a screen to represent a menu item, such as a category, a device function, contents, relevant information of the content, and so forth. In this embodiment, a photo category icon I1a, a music category icon I1b, a movie category icon I1c, a game category icon I1d, and a network category icon I1e are shown as category icons on the basic menu screen 30.

Among these icons displayed on the screen, the category icon located at a predetermined position on the screen is a selected category icon which represents the currently selected category. In the example shown in FIG. 4, the movie category icon I1c is the selected category icon, and a movie category is the selected category. The content reproducing device may display the selected category icon in a different manner from other category icons so that the user can readily recognize the selected category icon. For example, the selected category icon may be shown in a bright color or the category name may be additionally presented.

In the main menu icon displaying area 32, one or more basic menu icons are displayed, each representing a basic menu item corresponding to the selected category. A "basic menu item" is a menu item which is already stored in the content reproducing device when the category is selected. A basic menu item represents the contents stored in advance in the memory section 14 or the disk drive 15 of the device or an operational setting item for the device, and corresponds to one or more categories, and so on. For example, the movie contents registered in the content reproducing device correspond to a basic menu item associated with the movie category. A basic menu icon is composed of an image representative of the contents of the concerned menu item. For example, a basic menu icon representative of the contents of a movie may be made using an image or the like which is used for a sales package of that movie. Alternatively, a plurality of basic menu items may be represented by identical images as use of a different basic menu icon for every basic menu item is not mandatory.

Here, it should be noted that a basic menu item is a menu item which is already stored in the content reproducing device when the category is selected, and that the contents of a basic menu item list corresponding to the selected category are already determined when the category is selected. However, the basic menu item stored in the content reproducing device does not remain fixed and a basic menu item may be added or deleted with respect to the content reproducing device due to addition or deletion of a function of the content reproducing device or a user's setting.

For example, when a user registers a new movie content item to the content reproducing device, a basic menu item representative of the added content item is added to the content reproducing device, and, when a user deletes a movie content item registered in the content reproducing device, the basic menu item representative of the deleted content item is deleted from the content reproducing device. With addition or deletion as described above, the contents of the basic menu item list corresponding to the selected category when the movie category icon I1c, for example, is selected, are accordingly changed.

Among the basic menu icons displayed in the main menu icon displaying area 32, the icon displayed in the selected menu icon displaying area 33 is the selected basic menu icon which represents the currently selected basic menu item. In the example shown in FIG. 4, the icon I2 representative of the movie titled as AAA is the selected basic menu icon, and the movie AAA is the selected basic menu item. The content reproducing device displays the selected basic menu icon so as to be distinguishable from other icons in a manner different from that in which the selected category icon is displayed. For example, the selected basic menu icon may be shown as an image enclosed by a frame. Alternatively, the name of the menu item corresponding to the selected basic menu item may be additionally shown in the vicinity of the selected basic menu icon.

In the following, a process to select a category and a basic menu item by a user by instructing via the operating section 16 will be described (step S2).

With the basic menu screen 30 being shown, a user can change the selected category icon as desired using the right direction instruction key 21*c*, the left direction instruction key 21*d*, and so forth. Specifically, in the example shown FIG. 4, when the user presses the right direction instruction key 21*c*, the shown category icons move leftward on the screen, and as a result, the game category icon I1*d* at the right of the movie category icon I1*c* moves to, and is displayed at, the position where the movie category icon I1*c* has been located and displayed. As a result, the game category becomes the selected category.

Figure 5:
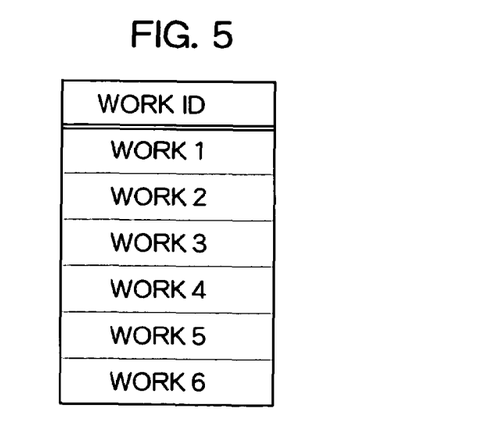
FIG. 5 is a diagram showing an example of a basic menu item list used by the information processing device in an embodiment according to the present invention.

When a new category becomes the selected category in response to a user's operation using the right direction instruction key 21*c* or the left direction instruction key 21*d*, the content reproducing device displays an icon representative of a basic menu item based on the basic menu item list corresponding to that selected category. It should be noted that a basic menu item list is a list including one or more basic menu items corresponding to the selected category among the basic menu items held in the memory section 14 or the disk drive 15. In the case of a movie category, the information of one or more movie contents, each of which is the basic menu item belonging to the movie category, is included in the basic menu item list such as is shown in FIG. 5.

In the following, a process to display an icon representative of a basic menu item will be described in detail.

The control section 11 reads out, from the memory section 14 or the disk drive 15, a basic menu item list corresponding to the selected category and the image data on a basic menu icon corresponding to a basic menu item included in the basic menu item list. Subsequently, the control section 11 outputs the image data on the icon and the information regarding the position on the screen to display the icon to the image processing section 12. It should be noted that the control section 11 may determine the position to display the icon based on the order in which the basic menu items are listed in the basic menu item list, or based on the order into which the basic menu items listed in the basic menu item list are rearranged using a predetermined method.

The image processing section 12 creates the data on an image to be displayed on the screen based on the image data and information regarding the displaying position of the icon, received from the control section 11, and outputs the data to the display control section 13. Having received the data from the image processing section 12, the display control section 13 converts the data into an image signal, and outputs the image signal to the display device. With this arrangement, when the movie category is selected as the selected category, as shown in FIG. 4, for example, an icon representative of the contents of a movie registered in the content reproducing device is displayed in the main menu icon displaying area 32 (32*a*, 32*b*) on the screen.

Here, it should be noted that the content reproducing device may alternatively conduct the process to display an image representative of a basic menu item in the main menu icon displaying areas 32*a*, 32*b*, using three dimensional graphic processing for displaying an object disposed in a virtual three dimensional space on a screen. In this case, a plane object having a size corresponding to that of the icon image is prepared in advance, and the control section 11 reads out the image data on the icon corresponding to the basic menu item and pastes the read out image data as a texture image onto the plane object. Thereafter, the control section 11 outputs the information of the object having the icon image data pasted thereon to the image processing section 12. In addition, the control section 11 determines the position of the icon in the virtual three dimensional space, and outputs the information regarding the determined position to the image processing section 12.

Based on the received information from the control section 11, the image processing section 12 disposes the object in the virtual three dimensional space. Thereafter, the image processing section 12 calculates the position, size and shape of the object disposed in the virtual three dimensional space on the screen to display, based on a given view point position and viewing direction, to thereby obtain two dimensional image data of the object. The display control section 13 in turn converts the two dimensional image data created by the image processing section 12 into an image signal and outputs the image signal.

It should be noted that, a part of the process to create an image to be displayed on the screen, such as a process to paste the image data of an icon onto a plane object, in the process described above as being conducted by the control section 11 may be conducted by the image processing section 12 instead. As described above, the use of three dimensional graphic processing enables presentation of the menu screen as if the menu screen is of a three dimensional space. This enables presentation to a user, of deformation and movement of an icon in a readily and intuitively understandable manner for the user in a process to redisplay the basic menu icon to be described later.

When the selected category is determined and the concerned basic menu icon is displayed in the main menu icon displaying area 32, as described above, the user can change the selected basic menu icon using the upper direction instruction key 21*a*, the lower direction instruction key 21*b*, or the like. For example, in the example shown in FIG. 4, when the lower direction instruction key 21*b* is pressed, the basic menu icon moves upward on the screen. In addition, the icon shown one below the icon I2 accordingly moves upward to be located and displayed in the selected menu icon displaying area 33, becoming a selected basic menu icon. In this case, the icon I2 moves to the lowest portion in the area 32*b* so as not to overlap the category icon. Meanwhile, when the upper direction instruction key 21*a* is pressed, the icon shown in the lowest portion in the area 32*b* becomes the selected basic menu icon, while the other basic menu icons move downward. With this operation, the user can desirably select a specific category and one of the basic menu items belonging to that category as a selected basic menu item.

In the following, a process to be conducted by the content reproducing device relative to the selected basic menu item when the user carries out an instruction operation via the operating section 16 with the basic menu screen 30 being shown, will be described. In response to the user's instruction operation, the control section 11 conducts a process to execute a function corresponding to the selected basic menu item, a process to display an optional menu screen for accepting a further detailed instruction relative to the selected basic menu item, or a process to display a subordinate menu. Here, it is assumed that pressing the O button 22*c*, the triangle button 22*a*, and the first right button 28R1, are respectively assigned with operations to instruct execution of a function, displaying of an optional menu screen, and displaying of a subordinate menu. For example, supposing that the selected basic menu item represents the movie contents, the control section 11 reproduces the contents in response to an instruction requesting to execute a function.

In the following, a process to be conducted by the content reproducing device in response to a user's instruction requesting to display a subordinate menu (step S3) will be described. When an instruction requesting to display a subordinate menu is given, the control section 11 determines whether or not the currently selected basic menu item is a menu item which has relevant information (step S4). This determination can be made by referring to the data category of the selected basic menu item. For example, when the basic menu item represents the movie contents corresponding to the movie category, the relevant information thereof is displayed.

Figure 6:
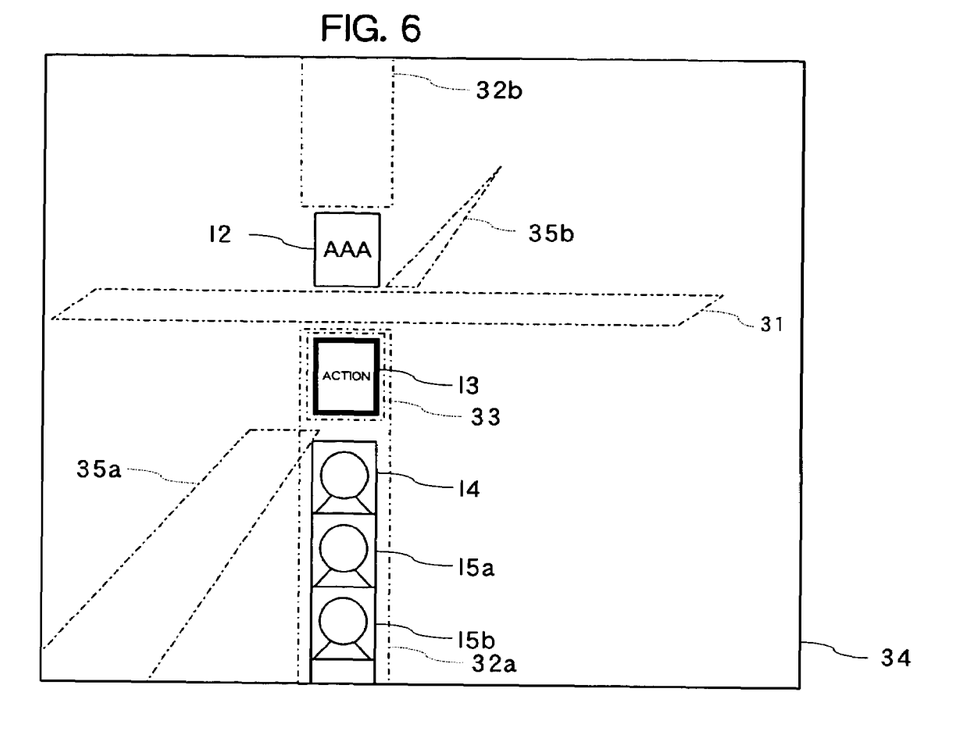
FIG. 6 is a diagram showing an example of a first relevant information screen to be displayed by the information processing device in an embodiment according to the present invention.

That is, when the selected basic menu item is a menu item which has relevant information, the control section 11 carries out a process to display a first relevant information screen 34 shown in FIG. 6 while setting temporary rejection of the receipt of a user's instruction operation. Specifically, a process to hold the identification information of the selected basic menu item, a process to create a relevant information menu, a process to redisplay the basic menu, and a process to display the relevant information menu are carried out. These processes will be described in the following.

Figure 7:
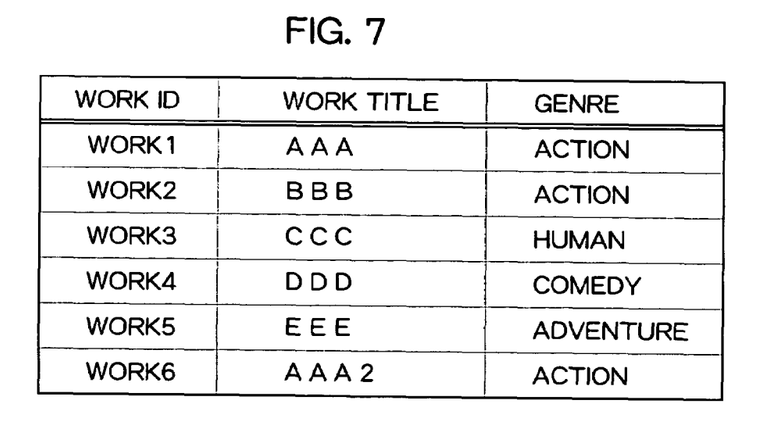
FIG. 7 is a diagram showing an example of a movie table used by the information processing device in an embodiment according to the present invention.

Initially, the control section 11 holds the identification information of the selected basic menu item in the memory section 14 (step S5). Suppose that a movie table such as is shown in FIG. 7 is held in the content reproducing device. As the selected basic menu item shown in the example of FIG. 4 is the movie AAA, the work ID, that is, the identification information of the selected basic menu item is "Work 1". Therefore, the control section 11 holds the information "Work 1" in the memory section 14 as the identification information of the selected basic menu item. This information will be used later in determination of the basic menu item to be initially displayed as a selected basic menu item when the operational screen returns from the relevant information screen back to the basic menu screen.

Subsequently, the control section 11 conducts a relevant information menu creating process (step S6). A relevant information menu creating process is a process to obtain, based on the selected basic menu item which remains selected when the first right button 28R1 is pressed, relevant information which is associated with the selected basic menu item, as information on one or more relevant information menu items by searching a relevant information table. With this processing, a relevant information menu item list which includes the one or more relevant information menu items is created.

Figure 8:
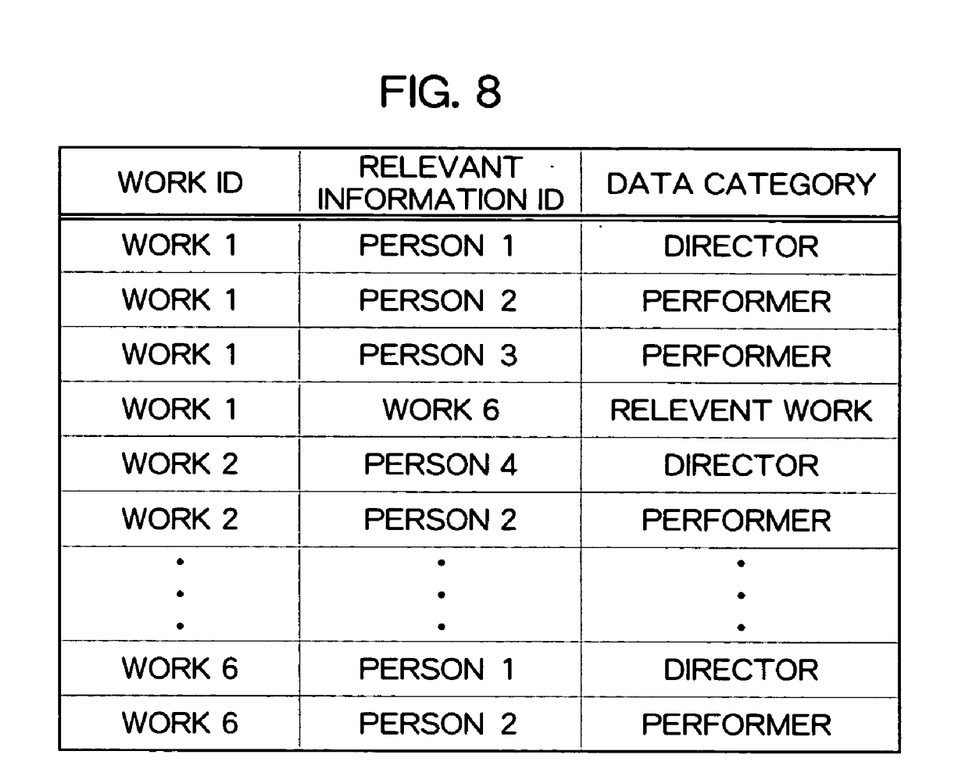
FIG. 8 is a diagram showing an example of a relevant information table used by the information processing device in an embodiment according to the present invention.

It should be noted that the relevant information table is a database for storing each of the basic menu items and its relevant information so as to be associated with each other. The relevant information table may be held in the memory section 14 or the disk drive 15. Alternatively, the relevant information table may be held in a server connected to a network such as the Internet. When the relevant information is held in a server, the control section 11 obtains the relevant information from the server via the communication section 17. For example, a relevant information table for the movie contents holds a work ID, a relevant information ID, and the data category of the relevant information, all listed in the manner of being associated with one another, as shown in FIG. 8.

Specifically, in the case where the selected basic menu item represents the movie AAA, the control section 11 searches the relevant information table using "Work 1", that is, the work ID of the movie AAA, as a search key. When the relevant information table has the contents shown in FIG. 8, the control section 11 obtains, as a result of the search, "Person 1" for the data category "director", "Persons 2 and 3" for the data category "performer", and "Work 6" for the data category "relevant work". Then, the control section 11 creates a relevant information menu item list, using the result of the search as a relevant information menu item.

Alternatively, the relevant information menu item list may include any item other than those which are obtained in a search carried out relative to the relevant information table. For example, referring to the movie table shown in FIG. 7, the control section 11 may include "Action", or the information concerning the genre of the movie AAA, which is the selected basic menu item, in the relevant information menu item list as relevant information of the data category "genre". As another alternative, two or more tables may be utilized as a relevant information table, so that collection of relevant information from a wider range by utilizing a plurality of movie information databases open to the public on a network, dynamic creation and displaying of a menu item can be achieved.

After the relevant information menu creating process, the control section 11 and the image processing section 12 conduct a basic menu redisplaying process (step S7). A basic menu redisplaying process is a process to display a basic menu icon which is displayed in the main menu icon displaying area 32 (32a, 32b) when displaying of a subordinate menu is instructed, in the previous menu icon displaying area 35 (35a, 35b), which is different from the main menu icon displaying area 32 (32a, 32b).

For redisplaying, the image of the icon may be geometrically deformed before being displayed. The deformation can be realized by mean of, for example, perspective processing. Alternatively, other processing may also be applicable, including, for example, enhancement of the transparency of the image, reduction of the brightness of the color, expression of the image in grey scale, and so forth. With this arrangement, the user can readily understand that the icon shown in the previous menu icon displaying area 35 (35a, 35b) is the icon representative of the menu item the user has already selected.

As yet another alternative, the selected basic menu icon at the time when the first right button 28R1 is pressed may remain displayed intact without deformation. This arrangement makes it clear, when relevant information is displayed, to which basic menu icon the displayed relevant information is relevant. In the example shown in FIG. 6, the icon I2 representative of the movie AAA, which is the selected basic menu icon, is displayed between the main menu icon displaying areas 32a and 32b.

Here, it should be noted that when screen data is created while the basic menu screen is being shown by disposing an object having the basic menu icon pasted thereon in a virtual three dimensional space, the content reproducing device may conduct a basic menu redisplaying process through three dimensional graphic processing. Specifically, the control section 11 calculates the position and orientation in the virtual three dimensional space, of the object having the basic menu icon pasted thereon and being rotated around a predetermined rotational axis in the virtual three dimensional space. Thereafter, the image processing section 12, having received the result of the calculation, calculates the position, size and shape of the object after the rotation on the screen to display, based on the given view point position and viewing direction to thereby obtain two dimensional image data on the object. In the example shown in FIG. 6, the icons shown in the main menu icon displaying areas 32a, 32b, respectively, in FIG. 4 are deformed and displayed in the previous menu icon displaying areas 35a, 35b in FIG. 6, respectively.

It should be noted that the movement of the object in the virtual three dimensional space is not always rotation around a rotational axis. Specifically, the control section 11 can deform, and display, an icon image representative of a basic menu item to be shown on the screen by moving or rotating the object such that the angle formed by the surface of the object where the basic menu icon is pasted and the viewing direction varies. Alternatively, instead of, or in accordance with, the movement of the object, the view point position and/or the viewing direction may be changed to thereby deform the image.

The control section 11 and the image processing section 12 may draw a process in which the object moves in the virtual three dimensional space. Specifically, the reference angle formed with the object located at the initial position is determined as 0 degrees, while the full rotation angle by which the object is ultimately rotated in the basic menu redisplaying process is determined as α degrees. While increasing the rotational angle is a stepwise manner beginning with 0 degrees, the control section 11 calculates the displaying positions and orientations of the object at the respective steps. Then, based on the result of the calculation made by the control section 11, the image processing section 12 sequentially displays the object at the respective steps on the screen to thereby draw the object in accordance with the gradual movement.

For example, suppose that the angle at which the object is displayed at the n-th step is $\beta(n)$ and that the angle at which the object is displayed at the (n+1)th step is $\beta(n+1)$, each rotational angle at which the object is sequentially displayed can be obtained using Expression $\beta(n+1)=(\alpha-\beta(n))*r+\beta(n)$. It should be noted that the value of $\beta(0)$, which is necessary to calculate the first rotational angle $\beta(1)$, is 0, or a reference angle. "r" represents a rate which determines a proportion by which the rotational angle is gradually increased. Like a case in which $\beta(1)=10.05$, $\beta(2)=18.5925$, and so forth, are obtained when $\alpha=67$ degrees and $r=0.15$, for example, $\beta(n)$ can be sequentially calculated. Thereafter, based on the calculation result, the state of the object having been rotated by 10.05 degrees is initially displayed, and the state of the object having been rotated by 18.5925 degrees is next displayed. In this manner, the object is sequentially displayed while repeating the drawing operation until the $\beta(n)$ becomes 67 degrees, or the full rotation angle. It should be noted that, in the determination of the rotational angle of the object using the calculation expression, adjustment of the value "r" enables adjustment of the speed at which the object moves.

When the process in which the object moves is drawn, the icon image may be shown such that the transparency (an alpha value) thereof may be gradually changed during the stepwise redisplaying of the moving object. With this arrangement, a process in which the icon image gradually becomes semitransparent can be expressed. The alpha value, which is used in sequential displaying of the object, can be calculated using a rate, similar to the calculation of the above-described rotational angle, and the speed at which the level of transparency varies can be adjusted according to the value of the rate.

Simultaneously with the above described basic menu redisplaying process, a category icon redisplaying process may be carried out. For example, when a basic menu icon is displayed as being pasted on a plane object disposed in the virtual three dimensional space, the category icon as well is displayed on the basic menu screen as being pasted on a similar plane object and disposed in the virtual three dimensional space. Then, the object having the category icon pasted thereon and the object having the basic menu icon pasted thereon are both rotated simultaneously. With this arrangement, the category icon also appears deformed, which clearly indicates that the selected category is not allowed to be changed on the first relevant information screen 34.

Thereafter, the control section 11 conducts a relevant information menu displaying process (step S8). A relevant information menu displaying process is a process to display, based on the relevant information menu item list created in the relevant information menu creating process (step S6), a relevant information menu icon representative of a relevant information menu item, on a screen. Specifically, the relevant information menu icon is displayed in the main menu icon displaying area 32 (32a, 32b) on the screen.

It should be noted that the main menu icon displaying area 32 (32a, 32b) is the display area on the basic menu screen 30, where the basic menu icon to be selected is displayed. Therefore, with an arrangement in which a relevant information menu icon to be selected is placed in this area, the result is that a basic menu icon for a user's selection on the basic menu screen 30 and a relevant information menu icon for a user's selection on the first relevant information screen 34 are displayed at the same location on the respective operational screens. This allows the content reproducing device to present the relevant information to the user without causing a sense of discomfort for the user. In addition, as the user can recognize the relevant information menu icon without largely changing his/her viewing direction, the user can instantly initiate an operation to select the relevant information menu icon.

Specifically, based on the relevant information menu item list created in the relevant information menu creating process, the control section 11 obtains the image data on a relevant information menu icon corresponding to a relevant information menu item included in the relevant information menu item list. The image data may be held in the memory section 14 or the disk drive 15. Alternatively, the image data may be provided, together with the relevant information table, by a server connected to a network. Thereafter, the control section 11 outputs the image data of the icon and information regarding the position on a screen where the icon is to be displayed, to the image processing section 12. Based on the received information, the image processing section 12 creates image data to be displayed on the screen, and thereafter, outputs the image data to the display device via the display control section 13.

Figure 9:
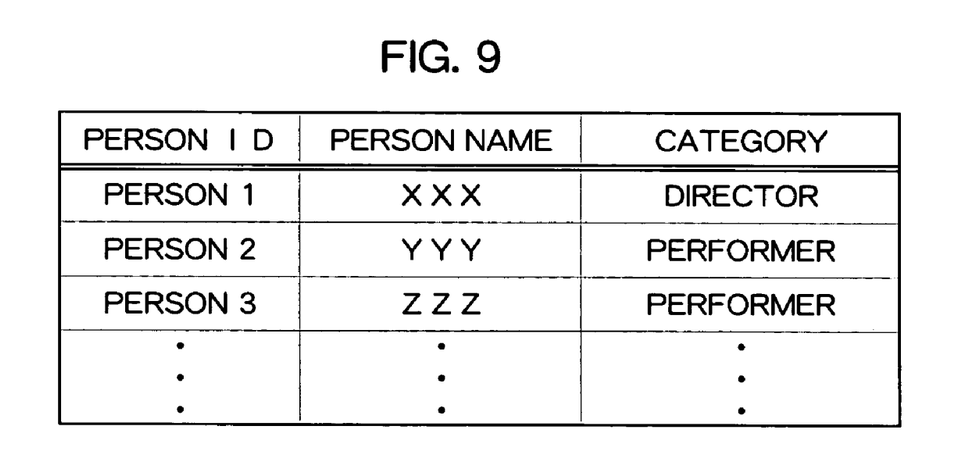
FIG. 9 is a diagram showing an example of a person table used by the information processing device in an embodiment according to the present invention.

Supposing that the relevant information of the movie AAA is to be displayed, for example, a relevant information menu item list is created in a relevant information menu creating process, as described above, which includes "Action" for the data category "genre", "Person 1" for the data category "director", "Persons 2 and 3" for the data category "performer", and "Work 6" for the data category "relevant work". With reference to the movie table of FIG. 7, it is known that "Work 6" corresponds to "Movie AAA2". Also, with reference to a person table such as is shown in FIG. 9, it is known that "Persons 2 and 3" correspond to "Persons YYY and ZZZ", respectively.

Based on this information, the control section 11 displays an icon I3 representative of the genre "Action", an icon I4 representative of "Person XXX", an icon I5a representative of "Person YYY", and an icon I5b representative of "Person ZZZ", as shown in FIG. 6. It should be noted that the icon I3 representative of the genre "Action", which is listed at the top of the relevant information menu item list, is displayed in the selected menu icon displaying area 33 as the selected relevant information menu icon. It should be noted that only a part of the icon I6 representative of "Relevant Work AAA2" included in the relevant information menu item list is displayed on the screen due to restriction on the number of icons which can be fully displayed in the main menu icon displaying area 32b.

It should be noted that when a process in which the basic menu icon moves from the main menu icon displaying area 32 (32a, 32b) to the previous menu icon displaying area 35 (35a, 35b) is displayed in a stepwise manner in the basic menu redisplaying process (step S7), as described above, the content reproducing device may simultaneously draw a process in which the relevant information menu icon to be newly displayed in the main menu icon displaying area 32 (32a, 32b) moves to, and is finally displayed in, the main menu icon displaying area 32 (32a, 32b). In this case, after completion of the relevant information menu creating process (step S6), the object having the relevant information menu icon pasted thereon is displayed on the screen in the state of being rotated by −α degrees from the posture in which it is desired to finally display the object.

Thereafter, together with the drawing of the movement of the object having a basic menu icon pasted thereon, which is carried out in the basic menu redisplaying process, drawing of the movement of the object having the relevant information menu icon pasted thereon is also conducted. With this arrangement, the relevant information menu icon is placed to be displayed in the main menu icon displaying area 32 (32a, 32b) simultaneously with the basic menu icon being placed to be displayed in the previous menu icon displaying area 35 (35a, 35b).

With the above described relevant information menu creating processing, basic menu redisplaying processing, and relevant information menu displaying processing, the content reproducing device displays a first relevant information screen 34 shown in FIG. 6.

Figure 10:
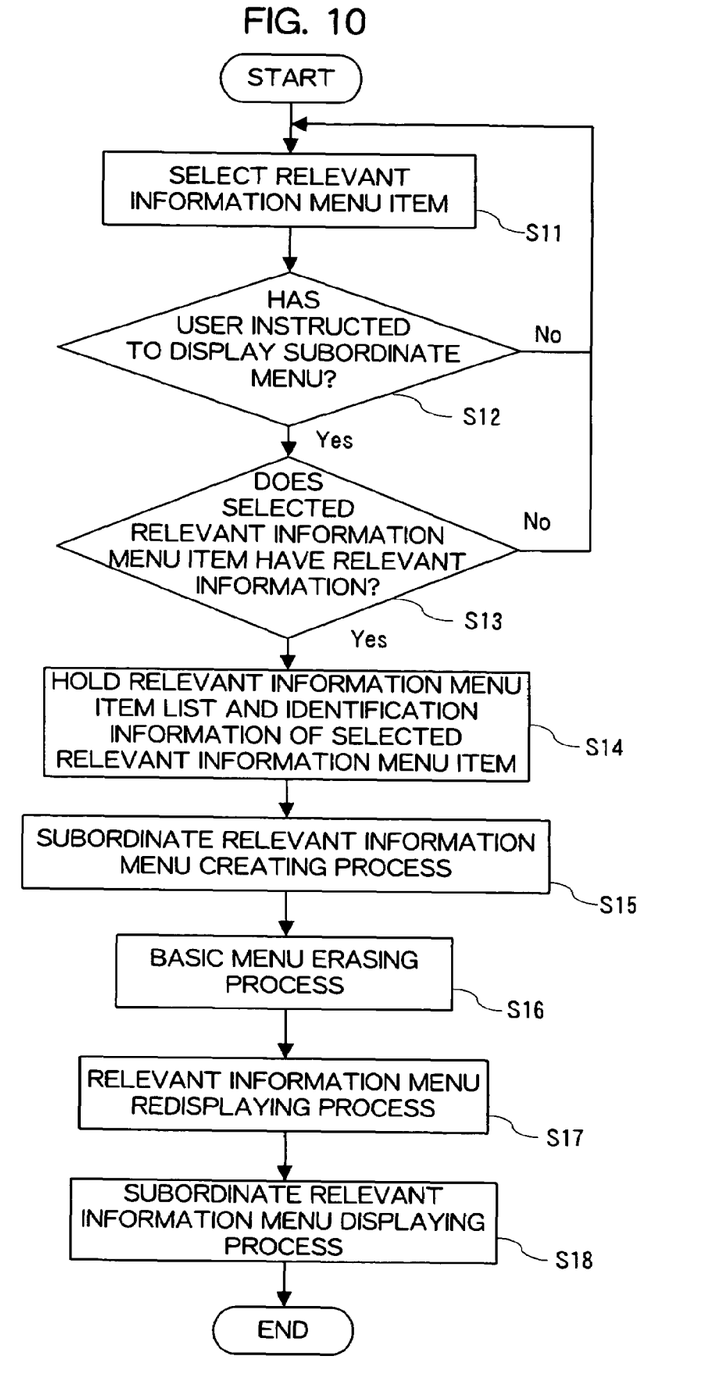
FIG. 10 is a flowchart showing a process to shift from a first relevant information screen to a second relevant information screen, which is carried out by the information processing device in an embodiment according to the present invention.

FIG. 10 is a flowchart of a process in which the content reproducing device shifts the currently displaying first relevant information screen 34 to another relevant information screen in response to a user's operation. In the following, a process to be conducted by the content reproducing device with the first relevant information screen 34 being shown will be described with reference to the flowchart shown in FIG. 10.

Among the relevant information menu icons shown in the main menu icon displaying area 32 (32a, 32b), the icon displayed in the selected menu icon displaying area 33 is the selected relevant information menu icon which represents the currently selected relevant information menu item. In the example of FIG. 6, the icon I3 representative of the "Action", or the genre of the movie AAA, is the selected relevant information menu icon, and the genre "Action" is the selected relevant information menu item. The selected relevant information menu icon is displayed in the manner of being distinguishable from other icons by, for example, being enclosed by a frame, similar to the selected basic menu icon shown on the basic menu screen 30. Also, when the name of the menu item corresponding to the selected relevant information menu item is displayed in the vicinity of the icon, the name of the menu item may be displayed together with the description of the data category. For example, in the example shown in FIG. 6, a note "Genre: Action" and so forth may be shown.

Figure 11:
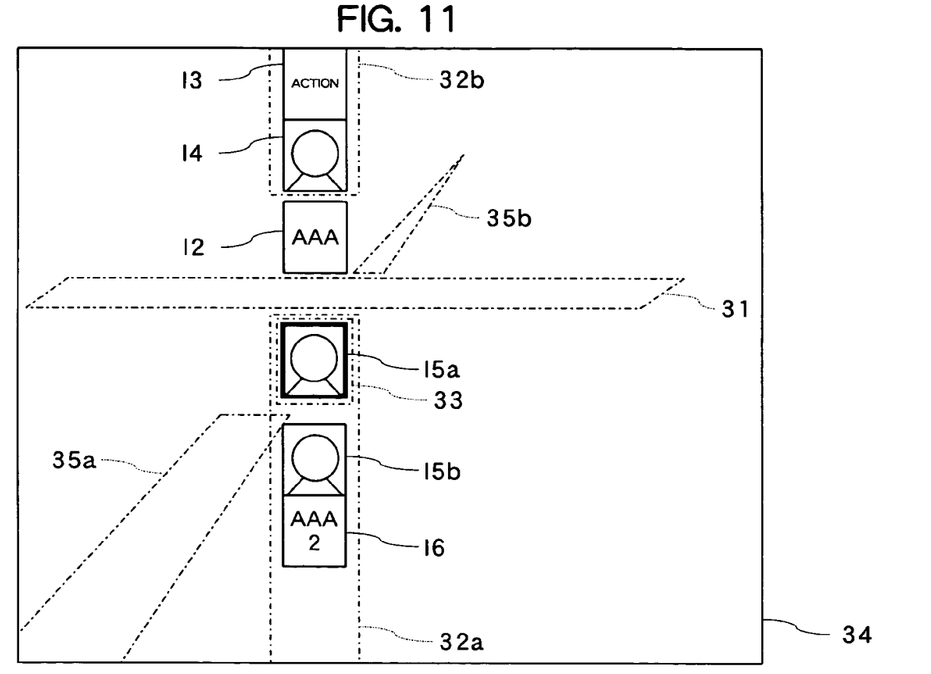
FIG. 11 is a diagram showing another example of the first relevant information screen to be displayed by the information processing device in an embodiment according to the present invention.

In this state, the user can desirably change the selected relevant information menu icon using the upper direction instruction key 21a, the lower direction instruction key 21b, and so forth, similar to the selected basic menu icon shown on the basic menu screen 30 (step S11). In the example shown in FIG. 6, when the lower direction instruction key 21b is pressed twice, the relevant information menu icon moves upward on the screen by an amount corresponding to two icons. As a result, as shown in FIG. 11, the icon I5a representative of "Person YYY" becomes the selected relevant information menu icon.

It should be noted that, on the first relevant information screen 34, the category icon, the icon I2 representative of the movie AAA, which is selected on the basic menu screen, and the basic menu icon shown in the previous menu icon displaying area 35 (35a, 35b) are displayed in a fixed manner. That is, these icons are not available for a user's instruction operation.

On the first relevant information screen 34, similar to the basic menu screen 30, the user can give an instruction relative to the selected relevant information menu item to execute a function, to display an optional menu screen, and to display a subordinate menu. In response to an instruction requesting to execute a function, for example, the detailed contents of the relevant information, which is represented as a selected relevant information menu item, are displayed.

Here, an instruction relative to the first relevant information screen 34 can be given by carrying out an instruction operation similar to that which is carried out when an instruction is given via the operating section 16 relative to the basic menu screen 30. Therefore, execution of a function, displaying of an optional menu screen, and displaying of relevant information can be instructed by carrying out a similar operation with respect to both of the basic menu screen 30 and the first relevant information screen 34. This arrangement allows the user to carry out an operation relative to the relevant information screen without feeling a sense of discomfort.

When an instruction requesting to display a subordinate menu is given while the first relevant information screen 34 is shown (step S12), the control section 11 initially determines whether or not the currently selected relevant information menu item is a menu item which has relevant information (step S13). This determination can be made by referring to the data category of the selected basic menu item.

Suppose that the data category of the selected relevant information menu item concerns a performer of the movie, an icon representative of a movie in which that performer appears is displayed. When the data category of the selected relevant information menu item concerns the genre of the movie, an icon representative of a movie which falls in that genre is shown. When the data category of the selected relevant information menu item concerns a relevant work, an icon representative of the relevant information of the relevant movie, such as a genre, a director, a performer, a relevant work, or the like, is shown.

When the selected relevant information menu item is a menu item which has relevant information, the content reproducing device carries out a process to display the relevant information of the menu item, while setting temporary rejection of the receipt of a user's instruction operation.

Figure 12:
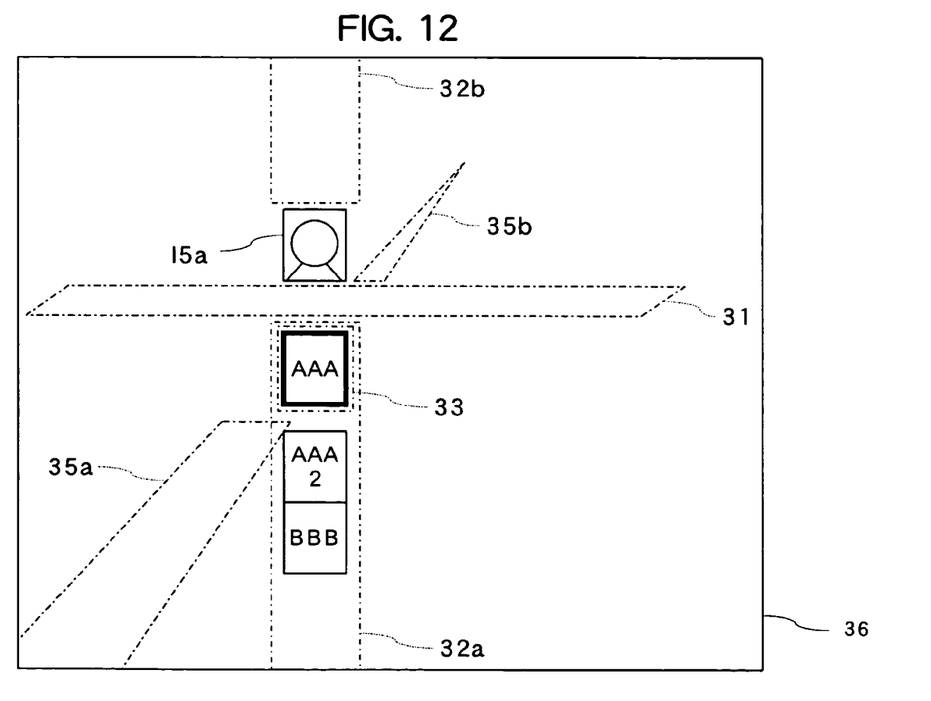
FIG. 12 is a diagram showing an example of a second relevant information screen displayed by the information processing device in an embodiment according to the present invention.

In the following, while referring to an example, such as is shown in FIG. 11, in which the selected relevant information menu item is "Person YYY", who is a performer of the movie AAA, a process to be conducted by the content reproducing device to display a second relevant information screen 36, as shown in FIG. 12, which is separate from the first relevant information screen 34, will be described.

Initially, the control section 11 stores the content of the relevant information menu item list, which is created in the relevant information menu creating process which is carried out when the current relevant information is displayed, and the identification information of the selected relevant information menu item, in the memory section 14 (step S14). Specifically, in the example of FIG. 11, "Action", or the information of the data category "genre", "Person 1", or the identification information of the data category "director", "Person 2", or the identification information of the data category "performer" YYY, "Person 3", or the identification information of the data category "performer" ZZZ, and "Work 6", or the identification information of the data category "relevant work" AAA2, all being created as relevant information of the movie AAA, are held in the form of a relevant information menu item list. In addition, as the identification information of the selected relevant information menu item, "Person 2" is held. The information is used later when the operational screen returns from the subordinate relevant information screen to the superior relevant information screen, in reproduction of the selected relevant information menu item and the relevant information menu item list to be selected shown on the restored superior relevant information screen.

Subsequently, the control section 11 carries out a subordinate relevant information menu creating process (step S15). This is a process to obtain relevant information associated with the selected relevant information menu item, as a relevant information menu item, similar to the relevant information menu creating process to be carried out when an instruction requesting to display a subordinate menu is made with the basic menu screen 30 being displayed. However, there may be a case in which a column on the table to be searched in the subordinate relevant information menu creating process may be different from that which is searched in the above described relevant information menu creating process.

Specifically, as "Person YYY" for the data category "performer" is the selected relevant information menu item here, the control section 11 conducts a search relative to the column relevant information ID, rather than the column work ID, using "Person 2", or the identification information of "Person YYY", as a search key on the relevant information table shown in FIG. 8. Thereafter, the control section 11 creates a subordinate relevant information menu item list, using the work ID of the record obtained in the search, as a subordinate relevant information menu item. Specifically, "Work 1", "Work 2", and "Work 6" are obtained as subordinate relevant information menu items.

Here, supposing that the data category of the selected relevant information menu item is the relevant work, the control section 11 obtains relevant information of the relevant movie through a search similar to that which is conducted in the relevant information menu creating process. Meanwhile, when the data category of the selected relevant information menu item is a genre, the control section 11 searches the movie table, rather than the relevant information table, and creates a list of movies which fall in the genre for which the search is carried out.

Thereafter, the control section 11 and the image processing section 12 conduct a basic menu icon erasing process (step S16). This is a process to erase the basic menu icon displayed in the previous menu icon displaying area 35 (35a, 35b) on the first relevant information screen 34. The control section 11 and the image processing section 12 may simply erase the basic menu icon from the screen. Alternatively, a process in which the basic menu icon gradually moves toward the outside of the screen until the basic menu icon disappears and is thereby erased may be displayed. In this case, the basic menu erasing process may be carried out simultaneously with the relevant information menu redisplaying process to be described later.

Further, the control section 11 and the image processing section 12 conduct a relevant information menu redisplaying process (step S17) and a subordinate relevant information menu displaying process (step S18). The content of these processes is basically similar to that of the basic menu redisplaying process and the relevant information menu displaying process, which are carried out to display the first relevant information screen 34. As a result of this arrangement, the relevant information menu icon which is displayed in the main menu icon displaying area 32 (32a, 32b) on the first relevant information screen 34 is displayed in the previous menu icon displaying area 35 (35a, 35b).

In addition, based on the subordinate relevant information menu item list which is obtained in the subordinate relevant information menu creating process (step S15), the icons representative of the movies AAA, AAA2, and BBB, in which "Person YYY", or the selected relevant information menu item, appears are displayed in the main menu icon displaying area 32a.

As described above, the content reproducing device displays the second relevant information screen 36 as shown in FIG. 12. With the second relevant information screen 36 being shown, the user can select the subordinate relevant information menu item by operating in a manner similar to that in which the user operates with the first relevant information screen 34 being shown, to thereby instruct to display the relevant information of the selected menu item shown on the second relevant information screen 36.

By repeating this operation, the user can display the relevant information screens in succession, such as, displaying relevant information, followed by the relevant information thereof, and so forth. With this arrangement, the user can successively review the relevant information of the contents, beginning with the basic menu screen, by operating in a consistent manner relative to consistently arranged operational screens.

When the user instructs to display a superior menu while successively displaying the relevant information screens, on the other hand, the relevant information screen preceding by one from the currently displayed relevant information screen can be displayed again. Here, an instruction requesting to display a superior menu can be given by pressing, for example, the first left button 29L1.

When an instruction requesting to display a superior menu is given, the control section 11 initially erases the relevant information menu icon currently displayed in the main menu icon displaying area 32 (32a, 32b). Thereafter, the control section 11 redisplays the relevant information menu icon which is displayed in the previous menu icon displaying area 35 (35a, 35b), in the main menu icon displaying area 32 (32a, 32b), using the relevant information menu item list and the identification information of the selected relevant information menu item which are held when the current relevant information screen is displayed.

Consequently, the relevant information screen one before the current displaying screen is displayed, with the selected relevant information menu item at the time of shifting of the operational screen to the current relevant information screen, being shown selected on the displayed screen. This is achieved by utilizing the identification information of the selected relevant information menu item which is held.

Further, by utilizing the relevant information menu item list and identification information of the selected relevant information menu item which are held when the relevant information screen preceding by one is displayed, an icon representative of the relevant information menu item list one before is displayed in the previous menu icon displaying area 35 (35a, 35b). With the above described processing, a previous relevant information screen can be reproduced, with the previously selected icon being shown selected on the restored screen.

It should be noted that, in the case where a process in which an object having an icon pasted thereon gradually moves is drawn in the relevant information menu redisplaying process, when the operational screen returns to the relevant information screen one before, a process in which the object displayed in the previous menu icon displaying areas 35a, 35b moves in the opposite direction from that in the movement for the above-described drawing and returns to the main menu icon displaying area 32 (32a, 32b) may be drawn. Alternatively, in addition to the drawing of the movement, the object which remains semitransparent as a result of gradual reduction of the opaqueness thereof may return to its original opaque state. With this arrangement, the user can intuitively recognize the fact that the displaying screen returns to the relevant information screen one before.

Also, when an instruction requesting to display a superior menu is given with the initially displayed first relevant information screen 34 being displayed, the content reproducing device conducts a process to shift to the basic menu screen 30. This is also a process to erase the relevant information menu icon shown in the main menu icon displaying area 32 (32a, 32b), and to redisplay the basic menu icon displayed in the previous menu icon displaying area 35 (35a, 35b), similar to the process to restore a relevant information screen from another relevant information screen, as described above. With this arrangement, it is possible to return to the original basic menu screen by following the selected menu items, even while the relevant information is successively displayed, by operating in a consistent manner relative to consistently arranged operational screens.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An information processing device, comprising:
    basic menu displaying means for displaying an image representative of a basic menu item list which includes one or more predetermined basic menu items, in a first displaying area;
    basic menu item selecting means for selecting one of the basic menu items from the one or more basic menu items as a selected basic menu item;
    first relevant information menu creating means for obtaining, from a relevant information table which stores each of the basic menu items and its relevant information so as to be associated with each other, relevant information associated with the selected basic menu item, as information on one or more first relevant information menu items, and creating a first relevant information menu item list which includes the one or more first relevant information menu items;
    first relevant information menu displaying means for displaying an image representative of the first relevant information menu item list, in the first displaying area; and
    basic menu redisplaying means for rotating and moving at least a part of the image representative of the basic menu item list that had previously been displayed in the first displaying area around a virtual three dimensional rotational axis to a second displaying area which is different from the first displaying area, wherein
    the first and second displaying areas are arranged linearly and intersect with each other so as to rotate in the virtual three dimensional space by an angle around the selected basic menu item.

2. The information processing device according to claim 1, further comprising:
    relevant information menu item selecting means for selecting one of the relevant information menu items from the one or more first relevant information menu items as a selected relevant information menu item;
    second relevant information menu creating means for obtaining information on one or more basic menu items associated with the selected relevant information menu item, as information on one or more second relevant information menu items, from the relevant information table, and creating a second relevant information menu item list which includes the one or more second relevant information menu items; and
    second relevant information menu displaying means for displaying an image representative of the second relevant information menu item list in the first displaying area; and
    first relevant information menu redisplaying means for displaying at least a part of the image representative of the first relevant information menu item list in the second displaying area.

3. The information processing device according to claim 2, further comprising:
    selected menu item holding means for holding identification information of the selected relevant information menu item; and
    first relevant information menu item holding means for holding identification information of the first relevant information menu item list, wherein
    when a user instructs to display a superior menu while the image representative of the second relevant information menu item list is displayed, the first relevant information menu displaying means displays the image representative of the first relevant information menu item list associated with the identification information held in the first relevant information menu item holding means, with the selected relevant information menu item associated with the identification information held in the selected menu item holding means, being shown selected thereon.

4. The information processing device according to claim 1, wherein the basic menu redisplaying means deforms at least a part of the image representative of the basic menu item list and displays in the second displaying area.

5. The information processing device according to claim 4, wherein
    the basic menu displaying means disposes an object representative of the image representative of the basic menu item list in the virtual three dimensional space, and displays the object representative of the image representative of the basic menu item list based on a given view point position and a given viewing direction, both being set in the virtual three dimensional space, and
    the basic menu redisplaying means changes an angle formed by a surface of the object and the viewing direction in the virtual three dimensional space to thereby deform at least a part of the image representative of the basic menu item list disposed in the virtual three dimensional space, and displays.

6. The information processing device according to claim 1, further comprising menu item storing means for storing one or more basic menu items which is/are a candidate or candidates of a basic menu item or items to be included in the basic menu item list.

7. The information processing device according to claim 6, further comprising menu item changing means for allowing a user to add and/or delete a menu item with respect to the one or more basic menu items stored in the menu item storing means.

8. An information processing device, comprising:
first list displaying means for displaying an image representative of a first list;
item selecting means for selecting one item from the first list as a selected item;
second list displaying means for displaying an image representative of a second list associated with the selected item; and
first list redisplaying means for deforming and displaying at least a part of the image representative of the first list, wherein
the second list displaying means displays the image representative of the second list in a first displaying area which is an area where the first list displaying means displays the image representative of the first list,
the first list redisplaying means rotates and moves at least a part of the image representative of the first list that had previously been displayed in the first displaying area around a virtual three dimensional rotational axis to a second displaying area which is different from the first displaying area, and
the first and second displaying areas are arranged linearly and intersect with each other so as to rotate in the virtual three dimensional space by an angle around the selected item.

9. The information processing device according to claim 8, wherein
the first list displaying means disposes an object representative of the image representative of the first list in the virtual three dimensional space, and displays the object representative of the image representative of the first list based on a given view point position and a given viewing direction, both being set in the virtual three dimensional space, and
the first list redisplaying means changes an angle formed by a surface of the object and the viewing direction in the virtual three dimensional space to thereby deform at least a part of the image representative of the first list disposed in the virtual three dimensional space, and displays.

10. A method of controlling an information processing device, comprising the steps of:
displaying an image representative of a basic menu item list which includes one or more predetermined basic menu items, in a first displaying area;
selecting one of the basic menu items from the one or more basic menu items as a selected basic menu item;
obtaining, from a relevant information table which stores each of the basic menu items and its relevant information so as to be associated with each other, relevant information associated with the selected basic menu item, as information on one or more first relevant information menu items, and creating a first relevant information menu item list which includes the one or more first relevant information menu items;
displaying an image representative of the first relevant information menu item list in the first displaying area; and
rotating and moving at least a part of the image representative of the basic menu item list that had previously been displayed in the first displaying area around a virtual three dimensional rotational axis to a second displaying area which is different from the first displaying area, wherein
the first and second displaying areas are arranged linearly and intersect with each other so as to rotate in the virtual three dimensional space by an angle around the selected basic menu item.

11. An information storage medium capable of being read by a computer which stores a program for having the computer to execute the following steps:
displaying an image representative of a basic menu item list which includes one or more predetermined basic menu items, in a first displaying area;
selecting one of the basic menu items from the one or more basic menu items as a selected basic menu item;
obtaining, from a relevant information table which stores each of the basic menu items and its relevant information so as to be associated with each other, relevant information associated with the selected basic menu item, as information on one or more first relevant information menu items, and creating a first relevant information menu item list which includes the one or more first relevant information menu items;
displaying an image representative of the first relevant information menu item list in the first displaying area; and
rotating and moving at least a part of the image representative of the basic menu item list that had previously been displayed in the first displaying area around a virtual three dimensional rotational axis to a second displaying area which is different from the first displaying area, wherein
the first and second displaying areas are arranged linearly and intersect with each other so as to rotate in the virtual three dimensional space by an angle around the selected basic menu item.

* * * * *

UNITED STATES PATENT AND TRADEMARK OFFICE
CERTIFICATE OF CORRECTION

PATENT NO.       : 7,634,740 B2                                        Page 1 of 1
APPLICATION NO.  : 11/452119
DATED            : December 15, 2009
INVENTOR(S)      : Enomoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this

Ninth Day of November, 2010

David J. Kappos
*Director of the United States Patent and Trademark Office*